Sept. 25, 1951     E. A. RICHARDS ET AL     2,568,764
ELECTRIC CURRENT RECTIFIER
Filed Feb. 28, 1948
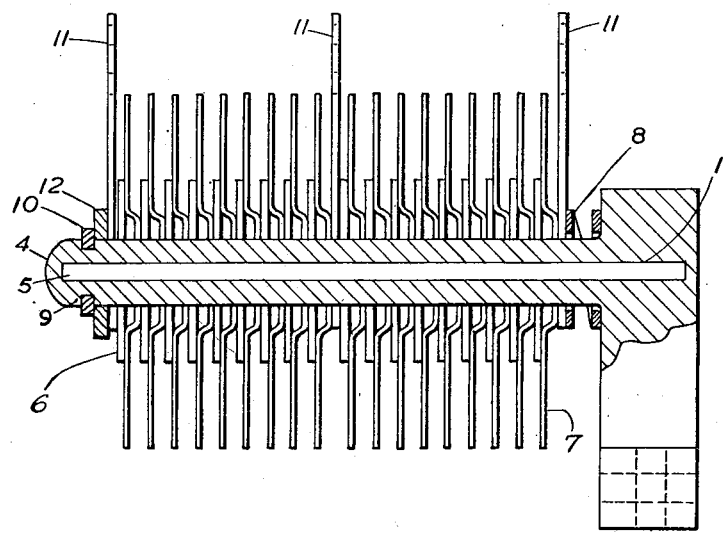
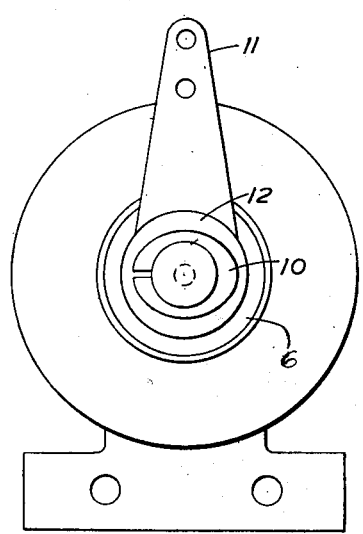
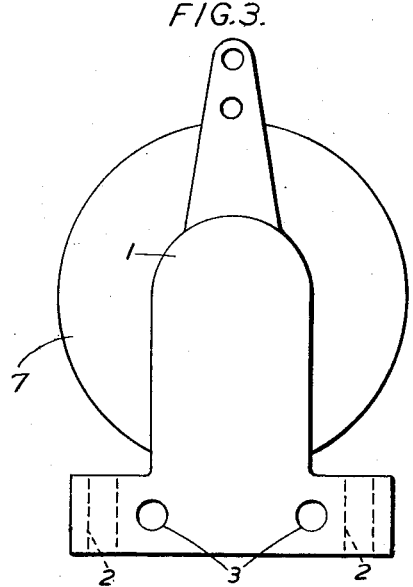
Inventor
Edward Arthur Richards
Leslie James Ellison
By
R. P. Morris
Attorney Patented Sept. 25, 1951

2,568,764

UNITED STATES PATENT OFFICE 2,568,764

ELECTRIC CURRENT RECTIFIER

Edward Arthur Richards and Leslie James Ellison, London, England, assignors to International Standard Electric Corporation, New York, N. Y.

Application February 28, 1948, Serial No. 11,878
In Great Britain March 7, 1947

1 Claim. (Cl. 175—366)

This invention relates to electric current dry rectifiers and has for its main object to provide a simple arrangement of rectifier assembly and mounting which is suitable for use for instance in domestic radio receivers and like apparatus, and which can be quickly and easily assembled.

According to one feature of the invention a dry rectifier assembly comprises an insulating rod or rods which is or are supported at one end on a mounting bracket and on which the rectifier plates are positioned and held under spring pressure by fastening means engaging the free end(s) of the rod(s). The rod is preferably moulded integrally with the mounting bracket and the fastening device may comprise a slotted washer engaging a groove in the free end of the rod, the spring pressure being provided by a helical spring on the other end of the rod. According to a second feature of the invention a dry rectifier assembly comprises rectifier plates and axially operating spring means mounted on at least one rod between a stop at one end and fastening means at the other end.

According to a subsidiary feature of the invention the rectifier plates are separated by cooling plates each and which is provided with a dished centre portion for engaging the rectifier plates of such depth as to provide the necessary spacing without the use of additional spacing washers.

The invention will be described with reference to a preferred embodiment shown in the accompanying drawing in which:

Fig. 1 shows a rectifier assembly in elevation partly in cross-section while:

Figs. 2 and 3 show the assembly of Fig. 1 in end elevation from opposite ends respectively.

A T-shaped mounting bracket 1 of insulating material is provided with two pairs of fixing holes 2, 2; 3, 3 at right angles to one another and carries a rod-like extension 4 which is an integral part of the bracket, and is strengthened by a metal wire 5 incorporated during the moulding. The insulating rod 4 serves as a support for rectifier plates 6, which are separated by metal washers 7 of suitable thickness which may be of sufficient area to constitute cooling fins when additional cooling is required then could be obtained from the plates themselves.

The rectifier discs may be of the centre contact type, as covered in our Patent No. 526,482, in which case the contact by the spacing members on the counter-electrode surfaces is arranged to be only at portions or areas of the surface at which the counterelectrode is not in contact with the active electrode e. g. selenium. The necessary contact pressure is provided by a helical spring or spring washer 8 which is placed on the insulating rod at one end of the assembly. The insulating rod 4 has at its free end a groove 9 which accommodates a locking washer 10 which is clenched into the groove after the discs and cooling fins or washers have been assembled.

As shown, the assembly on rod 4 comprises firstly the spring 8, next a first connecting tag 11, followed by rectifier plates 6 and spacing washers 7 alternately, another connecting tag 11, and a washer 12, after which the split locking washer 10 is inserted laterally into its groove 9 and locks the assembly against the pressure of spring 8. The length of rod between the inner face of bracket 1 and the groove 9 is designed for a given assembly to be accommodated under pressure.

Additional connecting tags 11 are included in the assembly as required, one being shown.

The cooling and spacing washers 7 are of a new design, in which the central portion is formed into a dish or recess, the depth of which is so arranged as to give the correct spacing between the rectifier plates and avoid the use of additional spacing washers. With this arrangement the assembly pressure must obviously be limited, because otherwise the dished portion of the washers would become flattened and the spring pressure produced by the helical spring is sufficient to make good contact, but insufficient to cause flattening of the cooling fins.

With some forms of rectifier plate, a plurality of rods 4 parallel to one another may be required and would be moulded integral with bracket 1.

It will be appreciated that such arrangements greatly facilitate assembly since the rectifier plates are mounted direct on the rod or rods from one end against the mounting bracket and the spring provides a predetermined pressure when the fastening is applied.

Other forms of fastening may be used for instance of outgoing members engaging any type of lateral incision or incisions in the surface of or through the rod, but the means shown have the merit of being very cheap and easy to assemble.

We claim:

A dry rectifier assembly comprising a non-metallic moulded rod which has an integral mounting bracket at one end and which is circumferentially grooved at the other end, a pile up including rectifier plates and axially operating spring means, and a slotted washer engaging the groove in the rod to hold the pile-up in position on the rod between the mounting bracket and the slotted washer against the pressure of said spring means.

EDWARD ARTHUR RICHARDS.
LESLIE JAMES ELLISON.

REFERENCES CITED

The following references are of record in the file of this patent:

UNITED STATES PATENTS

| Number | Name | Date |
|---|---|---|
| 1,218,216 | Schmidt | Mar. 6, 1917 |
| 1,801,836 | Aumann | Apr. 21, 1931 |
| 1,833,332 | Peter | Nov. 24, 1931 |
| 2,126,765 | Freeman | Aug. 16, 1938 |
| 2,302,087 | Addink et al. | Nov. 17, 1942 |
| 2,353,461 | Hamann | July 11, 1944 |

FOREIGN PATENTS

| Number | Country | Date |
|---|---|---|
| 112,440 | Australia | Feb. 13, 1941 |